(12) United States Patent
Hoshi et al.

(10) Patent No.: US 11,134,459 B1
(45) Date of Patent: Sep. 28, 2021

(54) WIRELESS COMMUNICATION SYSTEM AND WIRELESS COMMUNICATION DEVICE

(71) Applicant: HITACHI KOKUSAI ELECTRIC INC., Tokyo (JP)

(72) Inventors: Daiki Hoshi, Tokyo (JP); Hiroki Kato, Tokyo (JP); Tatsuhiro Nakada, Tokyo (JP)

(73) Assignee: HITACHI KOKUSAI ELECTRIC INC., Tokyo (JP)

( * ) Notice: Subject to any disclaimer, the term of this patent is extended or adjusted under 35 U.S.C. 154(b) by 0 days.

(21) Appl. No.: 17/271,697

(22) PCT Filed: Aug. 22, 2019

(86) PCT No.: PCT/JP2019/032831
§ 371 (c)(1),
(2) Date: Feb. 26, 2021

(87) PCT Pub. No.: WO2020/059407
PCT Pub. Date: Mar. 26, 2020

(30) Foreign Application Priority Data

Sep. 20, 2018 (JP) .............................. JP2018-175753

(51) Int. Cl.
*H04W 56/00* (2009.01)
*H04L 5/14* (2006.01)

(52) U.S. Cl.
CPC ......... *H04W 56/005* (2013.01); *H04L 5/1469* (2013.01); *H04W 56/001* (2013.01); *H04W 56/004* (2013.01)

(58) Field of Classification Search
None
See application file for complete search history.

(56) References Cited

U.S. PATENT DOCUMENTS

2010/0097962 A1  4/2010 Sahara et al.
2014/0301513 A1* 10/2014 Takahashi ............. H04J 3/0697
375/354

(Continued)

FOREIGN PATENT DOCUMENTS

JP     2006-174215 A    6/2006
JP     2008-85912 A     4/2008
JP     2014-39148 A     2/2014

OTHER PUBLICATIONS

International Search Report dated Nov. 26, 2019.

*Primary Examiner* — Jutai Kao
(74) *Attorney, Agent, or Firm* — Bacon & Thomas, PLLC

(57) ABSTRACT

In a base station, a signal synchronization unit detects a received timing of a signal from a mobile station. A correlation position protection unit corrects the received timing on the basis of time from a transmitting timing at which a signal transmitting operation to the mobile station is started to the received timing. A transmitting timing generation unit generates, on the basis of the received timing after the correction, a transmitting timing at which a subsequent signal transmitting operation to the mobile station is started. Further, an FB frame generation unit generates frame period information that indicates a correction value by the correlation position protection unit, and a transmitting processing unit transmits, to the mobile station, a signal including the frame cycle information in response to the generation of the transmitting timing.

4 Claims, 5 Drawing Sheets

(56) References Cited

U.S. PATENT DOCUMENTS

2016/0227494 A1\* 8/2016 Chandrasekaran ......................... H04W 56/001
2019/0150106 A1\* 5/2019 Teruhi ................... G04R 20/02
                                                                                                              370/338

\* cited by examiner

WIRELESS COMMUNICATION SYSTEM AND WIRELESS COMMUNICATION DEVICE

TECHNICAL FIELD

The present invention relates to a wireless communication system that performs wireless communication in a time division duplex (TDD) fashion.

BACKGROUND

Time division duplex (TDD), which is known as a duplexing method in bidirectional wireless communication, employs the same frequency in transmitting and receiving and alternately transmits and receives a downlink (DL) subframe directed from a base station to a mobile station and an uplink (UL) subframe directed from the mobile station to the base station at regular intervals on the time axis.

In TDD, the same frequency is divided in time, and thus it is necessary to prepare a guard time so that a UL subframe and a DL subframe do not collide with each other due to propagation delay time and the like. In TDD, a subframe length and/or a guard time length is generally set to a fixed length, and thus a frame length is fixed.

FIG. 4 shows an example of a transmitting and receiving timing chart of a case in which a frame length is fixed. $\Delta T$ is a propagation delay time that varies depending on the distance between a mobile station and a base station. T is a frame length, $T_{DL}$ is a DL subframe length, and $T_{UL}$ is a UL subframe length. $T_{SW}$ is a marginal switch time from a transmitting antenna to a received antenna and a marginal switch time from a received antenna to a transmitting antenna determined by each of switch (SW) units that the mobile station and the base station have. $T_{SW}$ is set to be sufficient for an actual SW switching time, and the mobile station and the base station are known to each other. $T_{t,BS}$ is time required for the transmitting processing by the base station, and $T_{t,MS}$ is time required for the transmitting processing by the mobile station.

The base station generates a transmitting timing, and then starts transmitting after the base station transmitting processing time $T_{t,BS}$ passes. After $\Delta\tau$ elapses from the start of the transmitting of the base station, the mobile station starts receiving. After the receiving is completed, the mobile station starts transmitting to the base station. The mobile station generates a transmitting timing and then starts transmitting after the mobile station transmitting processing time $T_{t,MS}$ passes. Similarly, after $\Delta\tau$ elapses from the start of the transmitting of the mobile station, the base station starts receiving. This series of transmitting and receiving processing is repeated in TDD.

The base station and the mobile station need to count time T from a transmitting timing of a current frame to a transmitting timing of a subsequent frame as a frame length and wait for the time T so that a UL subframe and a DL subframe may not collide with each other. When the frame length T is fixed, transmitting efficiency is degraded especially in the case of short $\Delta\tau$. Accordingly, a TDD method of increasing transmitting efficiency by adaptively changing a frame length is being proposed for mobile transmission of which a propagation distance varies over time.

As a conventional case, for example, Patent Document 1 discloses an invention for detecting a frame head in a received signal, calculating a transmitting timing adjustment time, and controlling a transmitting timing while adaptively changing a frame length so that a minimum necessary guard time may be ensured according to the propagation distance.

FIG. 5 is an example of a transmitting and receiving timing chart of a case in which a frame length is variable. $T_{BS(n)}$ is an $n^{th}$ frame length of a base station side, and $T_{MS(n)}$ is an $n^{th}$ frame length of a mobile station side. $T_{r,BS}$ is time required for synchronization processing by the base station, $T_{r,MS}$ is time required for synchronization processing by the mobile station, $T_{w,BS}$ is time counted from a received timing to a transmitting timing of a subsequent frame by the base station, and $T_{w,MS}$ is time counted from a received timing to a transmitting timing of a subsequent frame by the mobile station.

In repeated transmitting and receiving processing as in the case in which a frame length is fixed, the mobile station counts the time $T_{w,MS}$ from a received timing to a transmitting timing of a subsequent frame and generates the transmitting timing. The mobile station generates the transmitting timing and then starts transmitting after the mobile station transmitting processing time $T_{t,MS}$ passes. Similarly, after $\Delta T$ elapses from the start of the transmitting of the mobile station, the base station starts receiving. The base station likewise counts the time $T_{w,BS}$ from a received timing to a transmitting timing of a subsequent frame and generates the transmitting timing. After generating the transmitting timing, the base station starts transmitting after the base station transmitting processing time $T_{t,BS}$ passes. In this case, $T_{w,BS}$ and $T_{w,MS}$ have a fixed length, and thus $T_{BS(n)}$ and $T_{MS(n)}$ adaptively vary according to the propagation delay time $\Delta T$ in repeated transmitting and receiving processing. Consequently, it is possible to increase transmitting efficiency.

Meanwhile, for example, in a system employing orthogonal frequency division multiplexing (OFDM) signals, a receiving side converts a received signal on the time axis into a signal on the frequency-axis through fast Fourier transform (FFT) calculation processing. To perform FFT calculation processing, a signal in a valid symbol, including a guard interval signal added to the symbol, is taken in by as much as several preset FFT points, and the calculation is performed. To detect a symbol head, autocorrelation of guard intervals or cross-correlation calculated using a preamble signal is used. It is necessary to detect a peak value of the largest transmitting signal component included in the received signal and a position of the peak through the correlation calculation and set an FFT window (an intake section of data to be subjected to FFT processing) on the basis of the detected peak value and position.

In the case of detecting a received timing through the correlation calculation, as for mobile transmission, a peak value of correlation calculation is instantaneously buried in a noise level due to shadowing or the like, or a correlation value of a delayed wave becomes higher than that of a preceding wave due to multipath fading. Accordingly, in some cases, it is not possible to detect an appropriate received timing. In this case, a technique for increasing the stability of TDD by interpolating a peak position and reproducing a received timing (hereinafter, referred to as "correlation position protection") is known. In correlation position protection, a received timing is determined on the basis of the peak position of a previous frame. When the propagation delay time is gradually changed between frames, it has little effect to interpolate a received timing of a current frame using a received timing detected in a previous frame.

RELATED ART DOCUMENT

Patent Document 1: Japanese Patent Application Publication No. 2014-39148.

When correlation position protection is provided in a time division duplex (TDD) system in which a mobile station and a base station adaptively control a change in frame length independently of each other, it is difficult to stabilize communication. For example, when a base station performs correlation position protection on a received timing, the received timing may be changed due to a change in propagation delay or the like. In this case, the base station generates a transmitting timing by counting $T_{w,BS}$ from the received timing, and thus the transmitting timing of the base station is changed. However, the mobile station side has not learned that the base station has changed a frame length. Accordingly, when the mobile station receiving a transmitting signal from the base station of which the transmitting timing has been changed also performs correlation position protection on the received timing, the received timing is changed. As a result, similar to the base station, the mobile station also generates a transmitting timing by counting $T_{w,MS}$ from the received timing, and thus the transmitting timing of the mobile station is changed. Since this process occurs repeatedly, received timings of the mobile station and the base station are alternately changed in series. When correlation position protection is provided in a TDD system in which a change in frame length is adaptively controlled, successive changes in received timing lead to degradation of received signal quality and/or failure in signal synchronization.

SUMMARY

The present invention has been proposed in view of the above limitations and provides a technique for avoiding degradation of received signal quality and/or failure in signal synchronization in a TDD wireless communication system of which transmitting efficiency is increased by reconciling correlation position protection with adaptive frame length control.

In accordance with an aspect of the present invention, there is provided a wireless communication system including: a first wireless communication device; and a second wireless communication device that perform wireless communication in a time division duplex (TDD) fashion.

The first wireless communication device includes a first received timing detection unit configured to detect a received timing of a signal from the second wireless communication device; a first received timing correction unit configured to correct the received timing detected by the first received timing detection unit on the basis of time from a transmitting timing at which an operation of transmitting a signal to the second wireless communication device is started to the received timing detected by the first received timing detection unit; a first transmitting timing generation unit configured to generate a transmitting timing at which an operation of transmitting a subsequent signal to the second wireless communication device is started on the basis of the received timing corrected by the first received timing correction unit; and a first transmitting unit configured to transmit a signal including frame period information representing a correction value of the first received timing correction unit to the second wireless communication device when the transmitting timing is generated by the first transmitting timing generation unit.

The second wireless communication device includes a second received timing detection unit configured to detect a received timing of a signal from the first wireless communication device; a second received timing correction unit configured to correct the received timing detected by the second received timing detection unit on the basis of the frame period information received from the first wireless communication device through previous communication; a second transmitting timing generation unit configured to generate a transmitting timing at which an operation of transmitting a subsequent signal to the first wireless communication device is started on the basis of the received timing corrected by the second received timing correction unit; and a second transmitting unit configured to transmit the subsequent signal to the first wireless communication device when the transmitting timing is generated by the second transmitting timing generation unit.

The second wireless communication device may further include a storage unit configured to store the frame period information included in the signal received from the first wireless communication device, and the second received timing correction unit corrects the received timing detected by the second received timing detection unit on the basis of the frame period information stored in the storage unit.

Effect of the Invention

In accordance with the present invention, in a time division duplex (TDD) wireless communication system for increasing transmitting efficiency by reconciling correlation position protection with adaptive frame length control, it is possible to avoid degradation of received signal quality and/or failure in signal synchronization.

DETAILED DESCRIPTION

Figure 1:
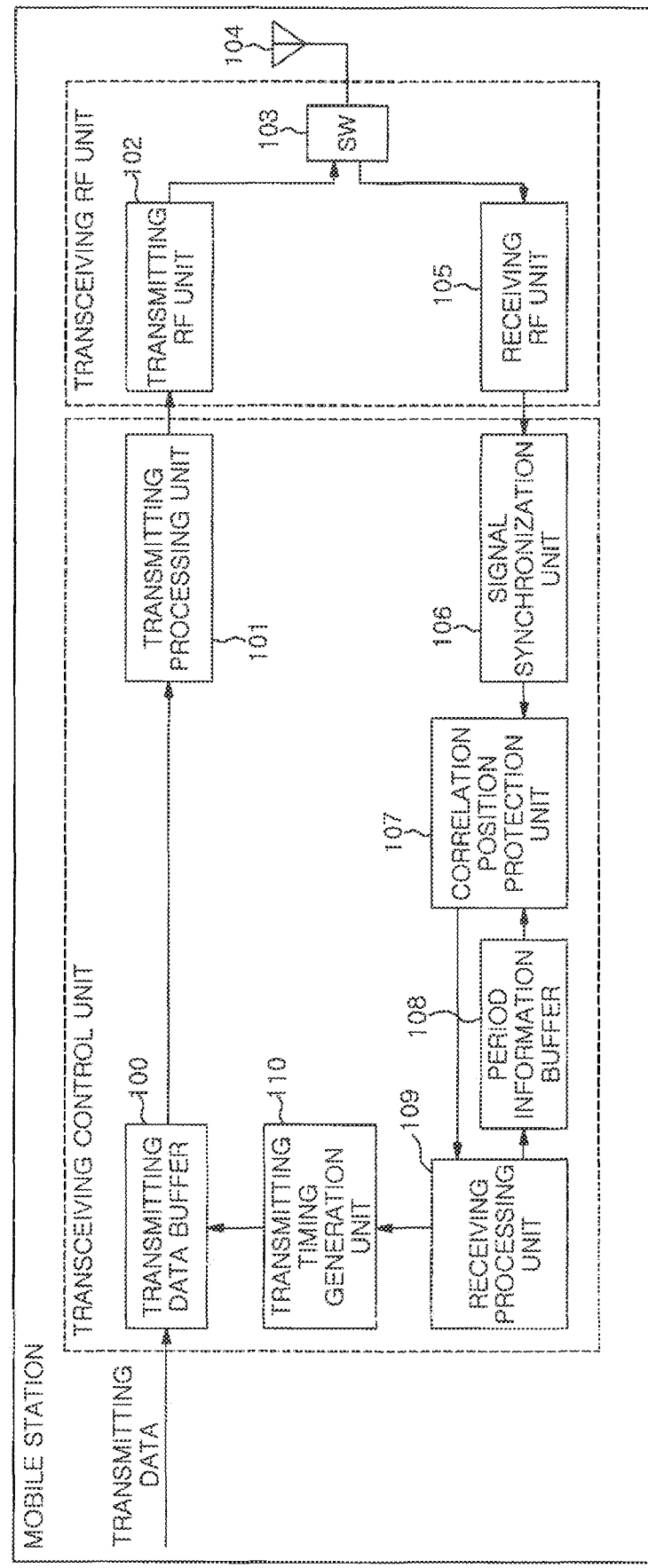
FIG. 1 is a block diagram showing an example of a configuration of a mobile station in a wireless communication system according to an embodiment of the present invention.

First, an overview of a wireless communication system according to the present invention will be described. The wireless communication system according to the present invention is a system that performs bidirectional communication between a mobile station and a base station in a time division duplex (TDD) fashion. In the following description, the base station corresponds to a first wireless communication device according to the present invention, and the mobile station corresponds to a second wireless communication device according to the present invention.

In the mobile station, a received timing of a received signal in a current frame is detected on the basis of a result of autocorrelation or cross-correlation calculation. Then, an average of the detected received timing and a received timing detected in a past frame is calculated to calculate a received timing of the current frame. Subsequently, the received timing of the current frame is corrected using a decoding result of frame period information that is received from a previous frame and calculated on the base station side. Frame period information obtained from a decoding result of the received signal in the current frame is stored in a buffer memory and used in correcting a received timing in the subsequent frame. When a transmitting error occurs with the frame period information, the frame period information is not stored. Subsequently, similar to the conventional case, a mobile station transmitting processing time is counted from a received timing at which correlation position protection is performed to a subsequent transmitting timing, and a frame transmitting timing is calculated. The mobile station starts transmitting to the base station using the obtained a transmitting timing.

For example, the base station may prepare a count value calculated from a transmitting timing of the current frame to a received timing thereof or a count value calculated upon arbitrary propagation delay as a reference value, and a difference between a count value calculated from the transmitting timing of the current frame to the received timing thereof and the reference value may be considered as the frame period information.

In the base station, a received timing of a received signal in a current frame is detected on the basis of a result of autocorrelation or cross-correlation calculation. Then, time from a transmitting timing of the base station to the detected received timing is counted, and an average of the time and time likewise counted in a past frame is calculated. Also, a timing at which the count value from the transmitting timing of the base station becomes the average is determined as a received timing of the current frame. The base station decodes a signal received from the mobile station at the obtained received timing.

Further, the base station counts time from the transmitting timing to the received timing at which correlation position protection is performed and calculates a propagation delay time from the count value. Then, a frame length calculated from the propagation delay time is used to calculate a transmitting timing of a subsequent frame. Further, frame period information in which the propagation delay time is taken into consideration begins to be transmitted to the mobile station as feedback (FB) information at a transmitting timing at which the frame period information calculated from the base station side is obtained.

Through the above process, the mobile station and the base station can reconcile correlation position protection with adaptive frame length control in TDD transmission. As another effect, even when it is not possible to receive frame period information normally due to an instantaneous transmitting error with FB information, it is possible to correct a received timing using past frame period information. Further, since only information not dependent on a device is used as frame period information, the present invention is valid even when the mobile station and the base station are devices made by different manufacturers. Consequently, according to the present invention, it is possible to realize TDD communication with high transmitting efficiency while avoiding degradation of received signal quality and/or failure in signal synchronization.

Figure 2:
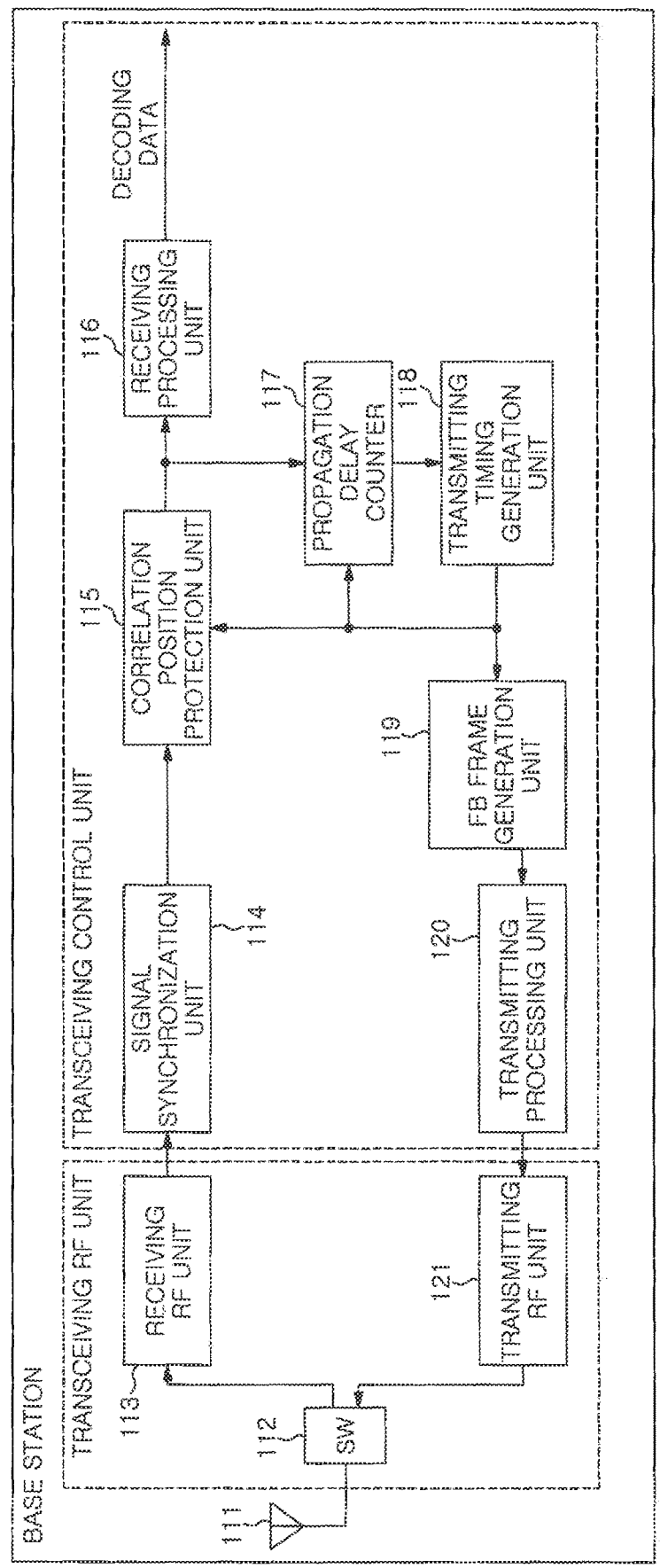
FIG. 2 is a block diagram showing an example of a configuration of a base station in the wireless communication system according to the embodiment of the present invention.

Hereinafter, an embodiment of the wireless communication system according to the present invention will be described with reference to FIGS. 1 and 2. FIGS. 1 and 2 show examples of configurations of the mobile station and the base station in the wireless communication system according to the embodiment. In the wireless communication system according to the embodiment, the base station and the mobile station form an FB loop to perform bidirectional communication in a TDD fashion, and both the mobile station and the base station have a transceiving control unit. A transmitting system that transmits and receives orthogonal frequency division multiplexing (OFDM)-modulated signals is described below, but the present invention can also be applied to single-carrier modulation.

The mobile station shown in FIG. 1 has an antenna 104, and the antenna 104 is connected to a switch (SW) unit 103. In the transmitting system employing TDD, the SW unit 103 connects a transmitting circuit to the antenna 104 in the case of the transmitting and connects a receiving circuit to the antenna 104 in the case of the receiving.

The mobile station includes a transceiving radio frequency (RF) unit including a transmitting RF unit 102, a receiving RF unit 105, and the SW unit 103. Further, the mobile station includes a transceiving control unit including a transmitting data buffer 100, a transmitting processing unit 101, a signal synchronization unit 106, a correlation position protection unit 107, a period information buffer 108, a receiving processing unit 109, and a transmitting timing generation unit 110.

The base station shown in FIG. 2 includes an antenna 111, and the antenna 111 is connected to an SW unit 112. In the transmitting system employing TDD, the SW unit 112 connects a receiving circuit to the antenna 111 in the case of the receiving and connects a transmitting circuit to the antenna 111 in the case of the transmitting.

The base station includes a transceiving RF unit including a transmitting RF unit 121, a receiving RF unit 113, and the SW unit 112. Further, the base station includes a transceiving control unit including a signal synchronization unit 114, a correlation position protection unit 115, a receiving processing unit 116, a propagation delay counter 117, a transmitting timing generation unit 118, an FB frame generation unit 119, and a transmitting processing unit 120.

In the transceiving control unit of the base station, the transmitting timing generation unit 118 generates a frame transmitting timing pulse, which represents a head of a TDD subframe to be described below, or frame period information on the basis of a signal received from the mobile station and outputs the frame transmitting timing pulse or the frame period information to the FB frame generation unit 119, the correlation position protection unit 115, and the propagation delay counter 117.

The FB frame generation unit 119 stores the frame period information in an FB frame in a frame format predetermined between the base station and the mobile station and outputs the frame period information to the transmitting processing unit 120.

The transmitting processing unit 120 includes a mapping processing unit, a preamble addition unit, an inverse fast Fourier transform (IFFT) calculation unit, and/or a guard interval addition unit. The transmitting processing unit 120 performs mapping, preamble signal addition, conversion from a frequency axis signal into a time axis signal, and guard interval addition with respect to the data input from the FB frame generation unit 119 and outputs the data to the transmitting RF unit 121.

The transmitting RF unit 121 performs digital-to-analog (D/A) conversion, up-conversion from a baseband (BB) to an RF band and the like with respect to a signal input from the transmitting processing unit 120 and outputs the signal to the SW unit 112. The transmitting circuit is connected to the antenna 111 by the SW unit 112, and the signal is output as a transmitting signal from the antenna 111.

The wireless signal transmitted from the base station is received by the antenna 104 in the mobile station, and the received signal is output to the SW unit 103. The receiving circuit is connected to the antenna 104 by the SW unit 103, and the received signal is output to the receiving RF unit 105 in the transceiving RF unit.

The receiving RF unit 105 performs down-conversion from the RF band to the BB, analog-to-digital (A/D) conversion, and the like on the received signal and outputs the received signal to the signal synchronization unit 106.

The signal synchronization unit 106 detects a received timing $t_{MS,n}$ of a received signal in an $n^{th}$ frame with respect to the signal input from the receiving RF unit 105 on the basis of a result of autocorrelation calculation of a guard interval or cross-correlation calculation based on a preamble signal. The received timing is not necessarily a peak value of the largest transmitting signal component included in the received signal due to the influence of multipath fading. Accordingly, a correlation position of a head from which an arbitrary correlation threshold value or more is obtained is determined as a peak position to detect a received timing. The signal synchronization unit 106 outputs the received signal from which the received timing is detected to the correlation position protection unit 107.

The correlation position protection unit 107 calculates an average value using the detected received timing $t_{MS,n}$ and a received timing detected in a past frame and generates a received timing $t_{MS,n}$ of the $n^{th}$ frame. The received timing $\bar{t}_{MS,n}$ of the $n^{th}$ frame is represented by Equation 1 below:

$$\bar{t}_{MS,n} = \frac{1}{N}\sum_{n=1}^{N} t_{MS,n}. \quad \text{(Equation 1)}$$

In addition, the correlation position protection unit 107 corrects the detected received timing using a decoding result of frame period information $\Delta T_{f,n-1}$ that is included in the FB information received from an $(n-1)^{th}$ frame to be described below and calculated in the base station side.

As a method of correcting the received timing, for example, assuming that a change in propagation delay time is sufficiently small, it is possible to generate the same received timing as the received timing of a previous frame using frame period information of the previous frame. Further, it is possible to estimate a received timing of a current frame by performing extrapolation from past frame period information stored in the period information buffer 108.

The frame period information $\Delta T_{f,n-1}$ is represented by Equation 2 below:

$$\Delta T_{f,n-1} = 2\Delta\tau + T_{DL} + T_{SW} \quad \text{(Equation 2)}$$

where $T_{DL}$ and $T_{SW}$ are information known to both the mobile station and the base station.

$T_{DL}$ and $T_{SW}$ are information known to both the mobile station and the base station. Accordingly, an increase or decrease in the value only depends on the propagation delay time $\Delta\tau$. Therefore, for example, when a frame length without propagation delay is prepared as a reference value and a received timing is corrected using the difference, it is possible to obtain a received timing adapted to propagation delay.

A corrected received timing $\bar{t}'_{MS,n}$ is represented by, for example, Equation 3 below using the frame period information $\Delta T_{f,n-1}$ and reference value information $\eta$:

$$\bar{t}'_{MS,n} = \bar{t}_{MS,n} + \Delta T_{f,n-1} - \eta \quad \text{(Equation 3)}.$$

Frame period information $\Delta T_{f,n}$ obtained from a decoding result of a received signal of the mobile station in the $n^{th}$ frame is stored in the period information buffer 108 and used in correcting a received timing in a subsequent frame. When a transmitting error occurs with the frame period information, the frame period information of the $n^{th}$ frame is not stored.

The correlation position protection unit 107 outputs a frame received timing pulse, which represents a received timing corrected through correlation position protection as described above, or a received signal to the receiving processing unit 109.

The receiving processing unit 109 includes a guard interval removal unit, an FFT calculation unit, and/or a demapping processing unit. The receiving processing unit 109 removes a guard interval of the received signal or performs conversion from a time axis signal into a frequency axis signal through FFT with respect to the signal input from the correlation position protection unit 107 and performs demapping on the received data. Further, the receiving processing unit 109 outputs the frame received timing pulse and frame period information obtained from FB information to the transmitting timing generation unit 110 and the period information buffer 108.

The transmitting timing generation unit 110 counts a mobile station processing time $T_{w,MS}$ from a received timing at which correlation position protection is performed to a transmitting timing of a subsequent frame on the basis of the frame received timing pulse and generates a frame transmitting timing pulse that represents a transmitting timing of the subsequent frame. After a fixed delay time has elapsed from the received timing at which correlation position protection is performed, the frame transmitting timing pulse is generated and output to the transmitting data buffer 100.

The transmitting data buffer 100 outputs transmitting data therein to the transmitting processing unit 101 on the basis of the frame transmitting timing pulse.

The transmitting processing unit 101 includes a mapping processing unit, a preamble addition unit, an IFFT calculation unit, and/or a guard interval addition unit. The transmitting processing unit 101 performs mapping, preamble signal addition, conversion from a frequency axis signal into a time axis signal, and guard interval addition with respect to the data input from the transmitting data buffer 100 and outputs the data to the transmitting RF unit 102.

The transmitting RF unit 102 performs D/A conversion, up-conversion from a BB to an RF band, and the like with respect to a signal input from the transmitting processing unit 101 and outputs the signal to the SW unit 103. The transmitting circuit is connected to the antenna 104 by the SW unit 103, and the signal is output as a transmitting signal from the antenna 104.

The wireless signal transmitted from the mobile station is received by the antenna 111 in the base station, and the received signal is output to the SW unit 112. The receiving circuit is connected to the antenna 111 by the SW unit 112, and the received signal is output to the receiving RF unit 113 in the transceiving RF unit.

The receiving RF unit 113 performs down-conversion from the RF band to the BB, A/D conversion, and the like on the received signal and outputs the received signal to the signal synchronization unit 114.

Similar to the signal synchronization unit 106, the signal synchronization unit 114 detects a received timing $t_{BS,n}$ of a received signal in an $n^{th}$ frame with respect to the signal input from the receiving RF unit 113 on the basis of a result of autocorrelation calculation of a guard interval or cross-correlation calculation based on a preamble signal. The signal synchronization unit 114 outputs the received signal from which the received timing is detected to the correlation position protection unit 115.

The correlation position protection unit 115 counts time $\Delta T_{c,n}$ from a transmitting timing of the base station to the detected received timing $t_{BS,n}$ and calculates an average value $\Delta \overline{T}_{c,n}$ of the time $\Delta T_{c,n}$ and a value likewise counted from a past frame. $\Delta \overline{T}_{c,n}$ is represented by Equation 4 below:

$$\Delta \overline{T}_{c,n} = \frac{1}{N} \sum_{n=1}^{N} \Delta T_{c,n}. \qquad \text{(Equation 4)}$$

When the count value from the transmitting timing of the base station becomes $\Delta \overline{T}_{c,n}$, the correlation position protection unit 115 generates a received timing $\bar{t}'_{BS,n}$ of an $n^{th}$ frame. The received timing $\bar{t}'_{BS,n}$ is represented by Equation 5 below:

$$\bar{t}'_{BS,n} = t_{BS,n}{}^{tx} + \Delta \overline{T}_{c,n} \qquad \text{(Equation 5)}$$

where $t^{tx}_{BS,n}$ represents a transmitting timing of the $n^{th}$ frame.

The correlation position protection unit 115 outputs a frame received timing pulse, which represents the received timing $\bar{t}'_{MS,n}$ corrected through correlation position protection as described above, to the propagation delay counter 117 and also outputs the received signal to the receiving processing unit 116.

The receiving processing unit 116 includes a guard interval removal unit, an FFT calculation unit, and/or a demapping processing unit. The receiving processing unit 116 removes a guard interval of the received signal and/or performs conversion from a time axis signal into a frequency axis signal through FFT with respect to the signal input from the correlation position protection unit 115 and performs demapping on the received data.

The propagation delay counter 117 starts clock counting on the basis of the frame transmitting timing pulse from the transmitting timing generation unit 118 and finishes counting on the basis of the frame received timing pulse from the correlation position protection unit 115. In this way, it is possible to count the time $\Delta T_{c,n}$ that includes the propagation delay time $\Delta \tau$ and is required for propagation. The propagation delay counter 117 outputs the counter information to the transmitting timing generation unit 118.

The transmitting timing generation unit 118 generates a frame transmitting timing pulse, which represents a head (a transmitting timing of a subsequent frame) of a TDD subframe, and frame period information to be transmitted to the mobile station on the basis of the counter information from the propagation delay counter 117 and outputs the frame transmitting timing pulse and the frame period information to the FB frame generation unit 119, the correlation position protection unit 115, and the propagation delay counter 117.

In the transmitting timing generation unit 118, a counter is operated when the transmitting timing pulse rises, and the transmitting timing pulse is designed to rise again in a step in which the count number becomes a frame length calculated using a propagation delay time $\Delta \tau_n$ to be described below so that a transmitting timing adaptive to the propagation delay may be generated. Accordingly, a frame length $T_{BS}(n)$ of the $n^{th}$ frame is represented by Equation 6 below:

$$T_{BS}(n) = T_{DL} + T_{UL} + 2\Delta \tau_n + 2T_{SW} \qquad \text{(Equation 6)}$$

The FB frame generation unit 119 stores the frame period information in an FB frame in a frame format predetermined between the mobile station and the base station. In this way, a signal including the frame period information is fed back from the base station to the mobile station.

Figure 3:
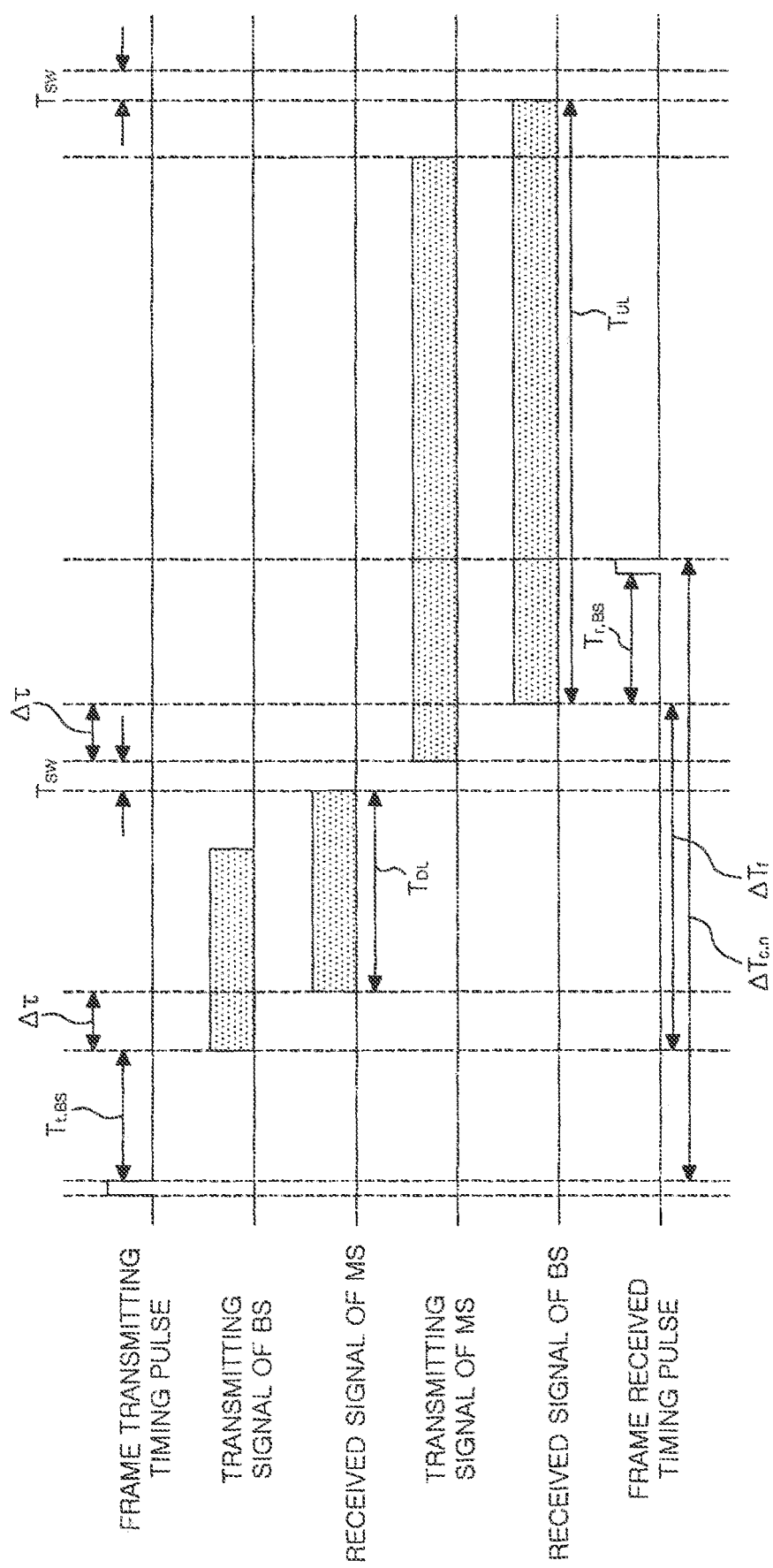
FIG. 3 shows a transmitting and receiving timing chart of the wireless communication system according to the embodiment of the present invention.
Figure 4:
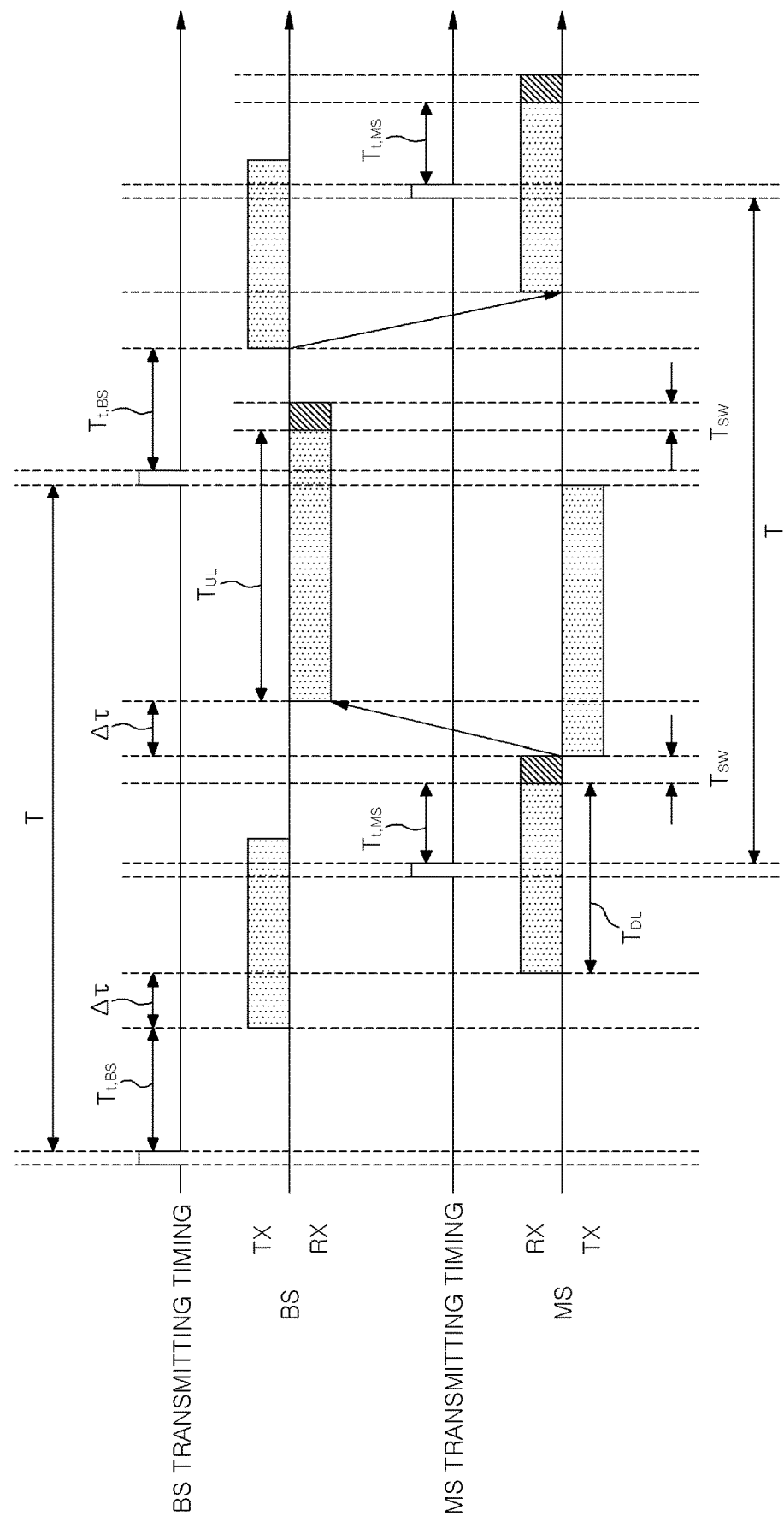
FIG. 4 shows an example of a transmitting and receiving timing chart of a case in which a frame length is fixed.
Figure 5:
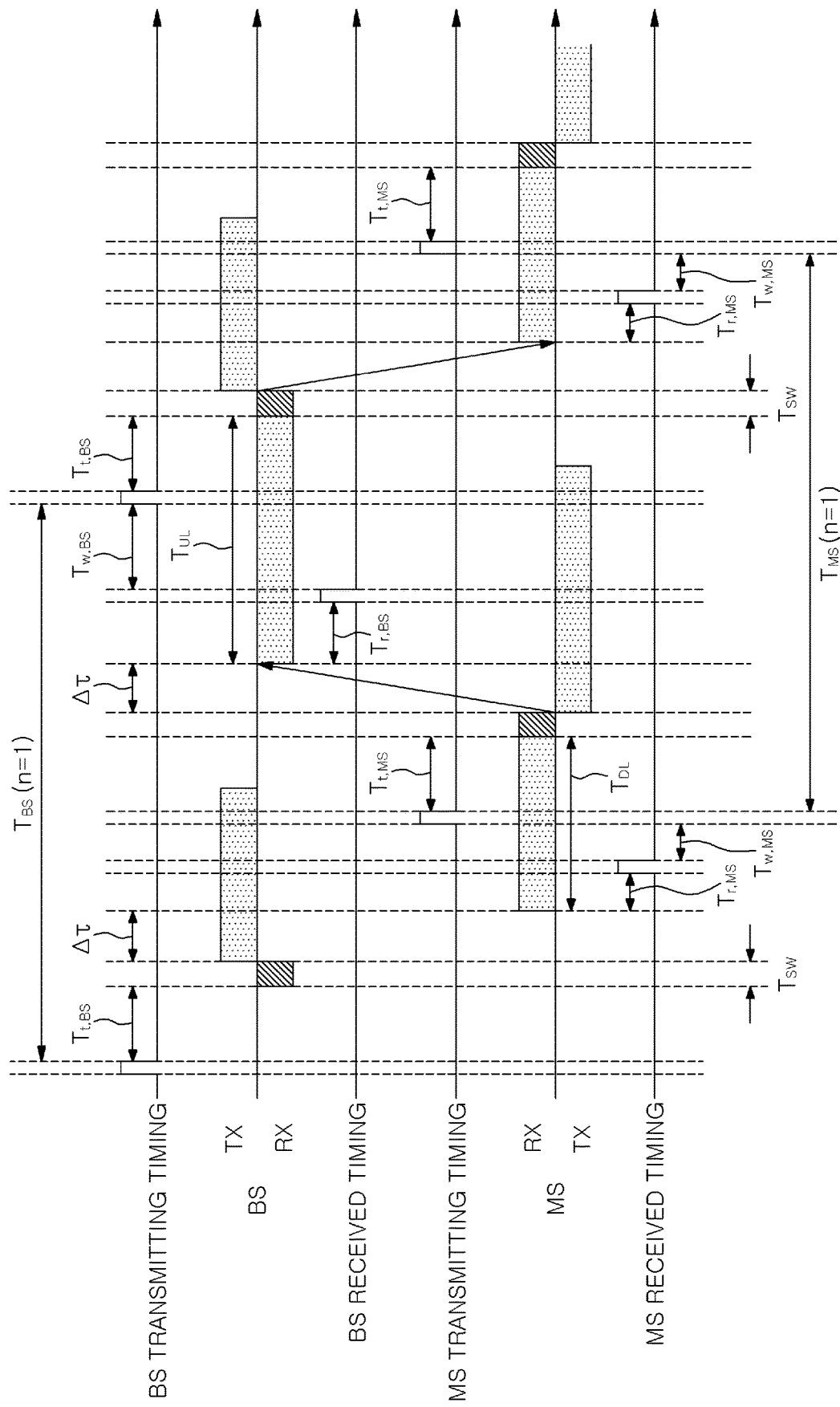
FIG. 5 shows an example of a transmitting and receiving timing chart of a case in which a frame length is variable.

FIG. 3 shows an example of a transmitting and receiving timing chart of the wireless communication system of the present embodiment. In FIG. 3, for the $n^{th}$ frame, the counter value $\Delta T_{c,n}$ from the transmitting timing of the base station to the received timing is represented by Equation 7 below. The counter value $\Delta T_{c,n}$ corresponds to a frame length of the $n^{th}$ frame. Further, Equation 7 below may be modified into Equation 8 below:

$$\Delta \overline{T}_{c,n} = T_{t,BS} + 2\Delta \tau + T_{DL} + T_{SW} + T_{r,BS}, \qquad \text{(Equation 7)}$$

$$\Delta \tau_n = \frac{\Delta T_{c,n} - (T_{t,BS} + T_{DL} + T_{SW} + T_{r,BS})}{2}. \qquad \text{(Equation 8)}$$

$T_{t,BS}$ is a transmitting processing time required for the base station to transmit a DL subframe and can be known in advance in a design step. $\Delta \tau_n$ is a propagation delay time and varies depending on the distance between the mobile station and the base station. $T_{DL}$ is a DL subframe length. $T_{SW}$ is a marginal switch time of each SW unit from a transmitting antenna to a received antenna and a marginal switch time of each SW unit from a received antenna to a transmitting antenna. $T_{SW}$ is set to be sufficient for an actual SW switching time and known to both the mobile station and the base station. $T_{r,BS}$ is a processing delay time from when the base station receives an UL subframe until synchronization is detected by the correlation position protection unit 115 and can be known in advance in the design step.

Frame period information $\Delta T_{f,n}$ required for control is calculated by Equation 9 below using the counter value $\Delta T_{c,n}$ obtained from Equation 7 above:

$$\Delta T_{f,n} = \Delta T_{c,n} - T_{t,BS} - T_{r,BS} \qquad \text{(Equation 9)}.$$

$T_{t,BS}$ and $T_{r,BS}$ are pieces of information that can be known in advance in the design step. Accordingly, information obtained by subtracting $T_{t,BS}$ and $T_{r,BS}$ from the counter value $\Delta T_{c,n}$ is transmitted as the frame period information $\Delta T_{f,n}$ so that the mobile station side can control a timing even without learning information of the base station side. The base station feeds the frame period information $\Delta T_{f,n}$ obtained from Equation 9 back to the mobile station.

When the base station becomes able to start transmitting due to the above-described series of transmitting processing and receiving processing, a signal is transmitted from the base station, and the transmitted signal is received by the mobile station. When the mobile station becomes able to start transmitting due to the above-described series of transmitting processing and receiving processing, a signal is transmitted from the mobile station. This process is repeatedly performed on the time axis.

As described above, the base station of the present embodiment includes the signal synchronization unit 114 that detects a received timing of a signal from the mobile station, the correlation position protection unit 115 that corrects the received timing detected by the signal synchronization unit 114 on the basis of time from a transmitting timing at which an operation of transmitting a signal to the mobile station is started to the received timing detected by the signal synchronization unit 114, the transmitting timing generation unit 118 that generates a transmitting timing at which an operation of transmitting a subsequent signal to the mobile station is started on the basis of the received timing corrected by the correction position protection unit 115, an FB frame generation unit 119 that generates frame period information representing a correction value of the correction position protection unit 115, and the transmitting processing unit 120 that transmits a signal including the frame period information generated by the FB frame generation unit 119 to the mobile station when the transmitting timing is generated by the transmitting timing generation unit 118.

Further, the mobile station of the present embodiment includes the signal synchronization unit 106 that detects a received timing of a signal from the base station, the period information buffer 108 that stores the frame period information included in the signal received from the base station, the correlation position protection unit 107 that corrects the received timing detected by the signal synchronization unit 106 on the basis of the frame period information stored in the period information buffer 108, the transmitting timing generation unit 109 that generates a transmitting timing at which an operation of transmitting a subsequent signal to the base station is started on the basis of the received timing corrected by the correlation position protection unit 107, and the transmitting processing unit 101 that transmits the subsequent signal to the base station when the transmitting timing is generated by the transmitting timing generation unit 109.

With such configurations, in the TDD wireless communication system that increases transmitting efficiency by reconciling correlation position protection with adaptive frame length control, it is possible to avoid degradation of received signal quality or failure in signal synchronization.

In the description of the above embodiment, frame period information is calculated by Equation 9. However, the counter value $\Delta T_{c,n}$ calculated by Equation 7 or information corresponding thereto can be fed back to the mobile station as frame period information. For example, a counter value calculated upon arbitrary propagation delay may be prepared as a reference value, and information on a difference between a counter value calculated from a transmitting timing of a current frame to a received timing thereof and the reference value may be transmitted as frame period information. When the difference information is used as frame period information, there is merit that the amount of information required for FB is reduced.

In the description of the above embodiment, when a peak position of the signal synchronization unit 114 is acquired, the correlation position protection unit 107 uses the peak position. However, the correlation position protection unit 107 may perform average calculation or interpolation calculation on peak positions up to a previous frame.

In the description of the above embodiment, UL communication from a mobile station to a base station and DL communication from a base station to a mobile station are based on single input single output (SISO) transmission. However, single input multiple output (SIMO) transmission, multiple input single output (MISO) transmission, or multiple input multiple output (MIMO) transmission may be used.

In the description of the above embodiment, a base station generates frame period information and takes control as a master, but a mobile station may generate frame period information and take control as a master. In other words, a mobile station may be operated as a first wireless communication device according to the present invention, and a base station may be operated as a second wireless communication device according to the present invention.

Although the present invention has been described in detail above, the present invention is not limited to the above wireless communication system and can be extensively applied to wireless communication systems other than the above. Also, the present invention can be provided as, for example, a method or way of performing a process according to the present invention, a program for implementing the method or way, a storage medium for storing the program, and the like.

This application claims priority to Japanese Patent Application No. 2018-175753, filed on Sep. 20, 2018, the entire contents of which are incorporated herein by reference.

INDUSTRIAL APPLICABILITY

The present invention can be used in various wireless communication systems that perform wireless communication in a time division duplex (TDD) fashion.

EXPLANATION OF REFERENCE NUMERALS

100: transmitting data buffer of mobile station
101: transmitting processing unit of mobile station
102: transmitting RF unit of mobile station
103: SW unit of mobile station
104: antenna of mobile station
105: receiving RF unit of mobile station
106: signal synchronization unit of mobile station
107: correlation position protection unit of mobile station
108: period information buffer of mobile station
109: receiving processing unit of mobile station
110: transmitting timing generation unit of mobile station
111: antenna of base station
112: SW unit of base station
113: receiving RF unit of base station
114: signal synchronization unit of base station
115: correlation position protection unit of base station
116: receiving processing unit of base station
117: propagation delay counter of base station
118: transmitting timing generation unit of base station
119: FB frame generation unit of base station
120: transmitting processing unit of base station
121: transmitting RF unit of base station

What is claimed is:
1. A wireless communication system comprising:
a first wireless communication device; and
a second wireless communication device,
wherein the wireless communication system performs wireless communication between the first wireless communication device and the second wireless communication device in a time division duplex fashion,
wherein the first wireless communication device comprises:
a first received timing detection unit configured to detect a received timing of a signal from the second wireless communication device;
a first received timing correction unit configured to correct the received timing detected by the first received timing detection unit on the basis of time from a transmitting timing, at which an operation of transmitting a signal to the second wireless communication device is started to the received timing detected by the first received timing detection unit;
a first transmitting timing generation unit configured to generate a transmitting timing at which an operation of transmitting a subsequent signal to the second wireless communication device is started on the basis of the received timing corrected by the first received timing correction unit; and a first transmitting unit configured to transmit a signal including frame period information representing a correction value of the first received timing correction unit to the second wireless communication device when the transmitting timing is generated by the first transmitting timing generation unit, and wherein the second wireless communication device comprises:

a second received timing detection unit configured to detect a received timing of a signal from the first wireless communication device;

a second received timing correction unit configured to correct the received timing detected by the second received timing detection unit on the basis of the frame period information received from the first wireless communication device through previous communication;

a second transmitting timing generation unit configured to generate a transmitting timing at which an operation of transmitting a subsequent signal to the first wireless communication device is started on the basis of the received timing corrected by the second received timing correction unit; and a second transmitting unit configured to transmit the subsequent signal to the first wireless communication device when the transmitting timing is generated by the second transmitting timing generation unit.

2. The wireless communication system of claim 1, wherein the second wireless communication device further comprises a storage unit configured to store the frame period information included in the signal received from the first wireless communication device, and the second received timing correction unit corrects the received timing detected by the second received timing detection unit on the basis of the frame period information stored in the storage unit.

3. A wireless communication device for performing wireless communication with a different wireless communication device in a time division duplex fashion, the wireless communication device comprising:

a received timing detection unit configured to detect a received timing of a signal from the different wireless communication device;

a received timing correction unit configured to correct the received timing detected by the received timing detection unit on the basis of time from a transmitting timing at which an operation of transmitting a signal to the different wireless communication device is started to the received timing detected by the received timing detection unit;

a transmitting timing generation unit configured to generate a transmitting timing at which an operation of transmitting a subsequent signal to the different wireless communication device is started on the basis of the received timing corrected by the received timing correction unit; and a transmitting unit configured to transmit the subsequent signal including frame period information representing a correction value of the received timing correction unit to the different wireless communication device when the transmitting timing is generated by the transmitting timing generation unit so that the different wireless communication device corrects a received timing with the same correction value as the received timing correction unit.

4. A wireless communication device for performing wireless communication with a different wireless communication device in a time division duplex fashion, the wireless communication device comprising:

a received timing detection unit configured to detect a received timing of a signal from the different wireless communication device;

a storage unit configured to store frame period information which is included in a signal transmitted from the different wireless communication device and represents a correction value of the received timing based on time from a transmitting timing at which the different wireless communication device starts a signal transmitting operation to a signal received timing of the different wireless communication device;

a received timing correction unit configured to correct the received timing detected by the received timing detection unit on the basis of the frame period information stored in the storage unit;

a transmitting timing generation unit configured to generate a transmitting timing at which an operation of transmitting a subsequent signal to the different wireless communication device is started on the basis of the received timing corrected by the received timing correction unit; and a transmitting unit configured to transmit the subsequent signal to the different wireless communication device when the transmitting timing is generated by the transmitting timing generation unit.

* * * * *